UNITED STATES PATENT OFFICE.

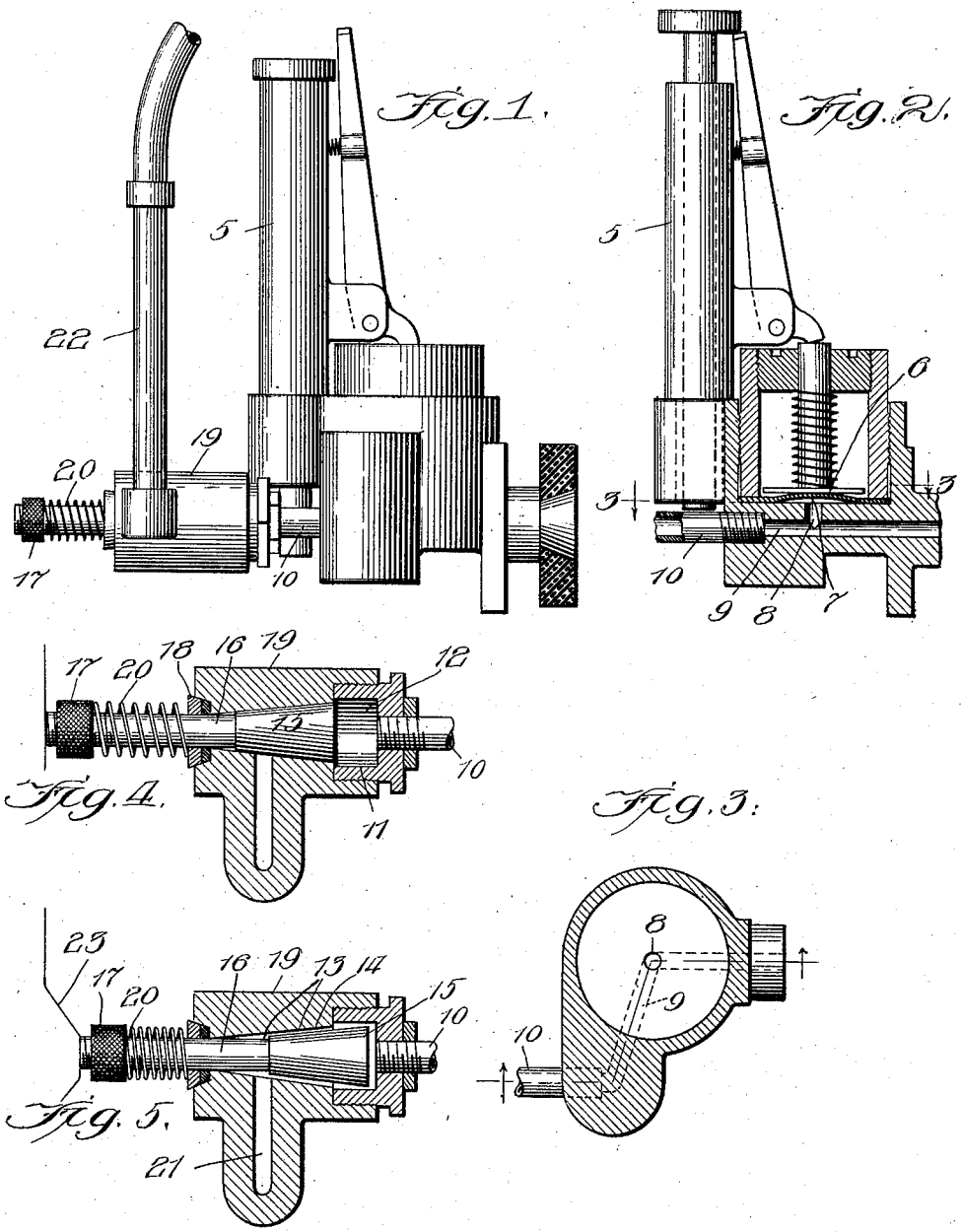

CHARLES B. McDONALD, OF CHICAGO, ILLINOIS, ASSIGNOR TO McDONALD MACHINE COMPANY, OF CHICAGO, ILLINOIS, A CORPORATION OF ILLINOIS.

CAN-TESTING MACHINE.

1,025,199.  Specification of Letters Patent.  Patented May 7, 1912.

Application filed March 23, 1911. Serial No. 616,370.

*To all whom it may concern:*

Be it known that I, CHARLES B. McDONALD, a citizen of the United States, residing at Chicago, in the county of Cook and State of Illinois, have invented certain new and useful Improvements in Can-Testing Machines, of which the following is a specification.

This invention relates to a form of valve member for controlling communication between the source of pressure supply and the air chamber of the testing machines and the interior of the can, and is a divisional application based on the structure shown in Letters Patent of the United States, No. 938,165, for can testing machines, issued October 26, 1909, to Charles B. McDonald.

One object of the present invention is to provide a simple and efficient mechanism for periodically establishing communication with a source of pressure supply for permitting a charge of air or other suitable compression medium to enter the air chamber of the testing mechanism and the interior of the can and be trapped therein.

A further object of the invention is to provide means for automatically and quickly unseating said valve and maintaining it in seated position, whereby, after the movement of the valve for the admission of air, further communication between the source of pressure supply and the air chamber of the testing mechanism, and the interior of the can and the source of pressure supply, will be quickly cut off.

The invention further consists in the features of construction and combination of parts hereinafter described and claimed.

In the drawings, Figure 1 is an elevation, showing a form of can testing device with the valve of the present invention thereon; Fig. 2 is a view partly in section and partly in elevation, showing a form of can testing device, the air chamber therefor, and the connections between the pipe leading from the valve mechanism to the air chamber of the testing mechanism and to the interior of the can; Fig. 3 is a section on line 3—3 of Fig. 2, looking in the direction of the arrow;
Fig. 4 is a sectional detail, showing the valve of the present invention in normal position; and Fig. 5 is a view similar to Fig. 4, showing the valve unseated.

The valve of the present invention is used in conjunction with can testing mechanisms which may be of the form shown in the drawings, and designated by the numeral 5, or any other suitable style of testing mechanism.

It is understood that the present invention is not concerned in any way with the specific form of can testing mechanism shown, and that the form shown is merely used for illustrative purposes, and such showing is not intended to limit the scope of the claims in any way.

The particular form of can testing mechanism shown in the accompanying drawings is shown and described in the above mentioned Letters Patent No. 938,165, issued October 26, 1909, to Charles B. McDonald, and detail description thereof is not deemed necessary at this time. It is only considered necessary to state that the can testing mechanism employs a diaphragm 6 which is in communication with an air chamber 7, but the use of the diaphragm is not considered essential to the present invention and is not claimed as a part thereof.

The air chamber 7 is in communication with a duct or passage 8 leading from a passage 9, which extends beyond the passage 8 and communicates with the interior of the can to be tested. In the form shown, the passage 9 is in communication with a pipe 10 which leads to a chamber 11, although obviously the method of establishing communication between the duct 9 and the chamber 11 may be varied to suit the particular type of testing mechanism with which the valve of the present invention might be used. The chamber 11 consists of an enlarged portion 12 extending from a tapered portion 13, the wall 14 of the tapered portion acting as a valve seat for a tapered valve plug 15, which is provided with a stem 16 screw-threaded at its outer end to receive a nut 17, and interposed between said nut and a plug 18 in a valve housing 19 is a helically coiled tension member 20. The tapered portion 13 of the chamber 11 is in communication with a duct or passage 21, which communicates with a pipe 22 leading to the source of pressure supply. An additional advantage is obtained by the use of a tapered valve member, since it will always adjust itself to a firm seat even when it becomes worn during usage.

The housing 19 which incloses the valve member is connected, through the medium of the pipe 10, to the casing of the can testing mechanism, and hence it is carried with the can testing mechanism. By utilizing this form of device, a charge of air can be admitted to the pipe 22 and held in said pipe until the can is firmly clamped, and can then be admitted into the testing mechanism and body of the can, and after such charge has been admitted, communication between the air chamber of the testing mechanism and the outside air, and between the interior of the can and the outside air, or between either of these parts and the source of pressure supply, is automatically and quickly closed by the action of said valve. This mechanism insures the admission of a certain amount of air to each of the testing mechanisms and to each can, and insures against a further admission of pressure or a leakage of pressure after this initial supply. Thus a certain definite amount of air is always initially present in the testing mechanisms and in the can, so that a slight leakage in the can will be sufficient to influence the testing mechanism and insure the discharge or elimination of the can.

In the absence of any means for regulating the amount of pressure entering the can, it might sometimes happen that an excess of pressure would be present, so that the testing mechanism would fail to operate, even though a slight leakage were present in the can; or a continued communication between the air supply and the air chamber of the testing mechanism and the interior of the can might be present, and hence the efficiency of the testing mechanism destroyed. By the utilization of a valve member which is capable of admitting a charge of air into the can and to the air chamber of the testing mechanism, the operation of the testing mechanism, whether the opening in the can be large or small, is certain.

The operation of the valve of the present invention is as follows: Air is admitted to the pipe 22, passes into the duct 21, and when the can is clamped properly in position the valve member 15 is unseated by having the end of the stem 16 contact a suitably fixed cam surface 23, or by other suitable means, and the valve is moved into the position shown in Fig. 5. Air then enters the tapered chamber 13 and into the enlarged portion 12 of the chamber 11, thence through the pipe 10 and into the duct 9, and thence into the interior of the can, and in passing through the duct 9 the air also enters the duct 7, and thence into the air chamber 6 of the testing mechanism, so that when the valve is unseated a charge of air is admitted to the air chamber of the testing mechanism and to the interior of the can. After the valve has passed by its point of engagement with the cam or other actuating member which unseats it, the spring 20 will act to quickly return the valve to the position shown in Fig. 1, and the air previously admitted to the air chamber of the testing mechanism and the interior of the can is trapped, and further communication between the air chamber of the testing mechanism and the outside air or the source of pressure supply, and between the interior of the can and the outside air or the source of pressure supply is prevented, escapement of the air only being possible by reason of the presence of a leak in the can or by the unclamping of the can, this latter operation, of course, exhausting the air and returning the parts of the testing mechanism to normal position, but, as understood by anybody skilled in the can testing machine art, this operation does not take place until after the testing operation is completed.

It may be found expedient in operation to provide the valve member 15 with a seating face of compressible material, and it is understood that this form of construction is embraced within the scope of the present invention.

I claim:

In a can testing machine, the combination of testing mechanism, a housing therefor, an air chamber in conjunction therewith, a source of pressure supply, a slidable tapered valve controlling communication between the source of pressure supply and the air chamber of the testing mechanism, including a member having a tapered seat for said valve, a tension member for normally maintaining said valve in wedging engagement with its seat, and means for periodically sliding and unseating said valve to permit the passage of air from the source of pressure supply to the air chamber, said tension mechanism effecting a quick return of said valve to normal position, substantially as described.

CHARLES B. McDONALD.

Witnesses:
CHAS. E. ENNES,
EULALIE LIND.

---

Copies of this patent may be obtained for five cents each, by addressing the "Commissioner of Patents, Washington, D. C."